United States Patent [19]
Jeromson et al.

[11] Patent Number: 5,213,308
[45] Date of Patent: May 25, 1993

[54] VALVE WITH HANDLE LATCH/LOCK

[75] Inventors: Jeffrey T. Jeromson, Sagamore Hills; Cal R. Brown, Euclid; Peter C. Williams, Cleveland Heights, all of Ohio

[73] Assignee: Whitey Company, Highland Hts., Ohio

[21] Appl. No.: 897,859

[22] Filed: Jun. 12, 1992

[51] Int. Cl.⁵ ............... F16K 35/02; F16K 35/06
[52] U.S. Cl. .................. 251/95; 70/180; 70/207; 70/224; 137/385; 251/106
[58] Field of Search ............ 70/176, 177, 180, 207, 70/224, DIG. 31, DIG. 67; 137/385; 251/95, 101, 102, 104, 105, 106, 315

[56] References Cited

U.S. PATENT DOCUMENTS

| | | | |
|---|---|---|---|
| 195,611 | 9/1877 | Jarecki | 70/180 |
| 861,501 | 7/1907 | Case | 251/106 |
| 924,423 | 6/1909 | Brandenburg | 251/106 |
| 943,838 | 12/1909 | Miller | 251/105 |
| 951,878 | 3/1910 | Dolan | 251/105 |
| 1,121,024 | 12/1914 | Knezek | 251/110 |
| 1,412,720 | 4/1922 | Szafranski | 70/176 |
| 1,419,469 | 6/1922 | Paschke | 70/176 |
| 1,437,369 | 11/1922 | Tallman | 251/106 |
| 2,081,464 | 5/1937 | Stewart | 137/385 |
| 2,223,032 | 11/1940 | Farmer | 251/102 |
| 2,853,100 | 9/1958 | Donnelly | 251/102 |
| 3,228,415 | 1/1966 | Geiss | 137/385 |
| 3,349,639 | 10/1967 | Magoon | 251/105 |
| 3,648,970 | 3/1972 | Hartmann et al. | 137/385 |
| 4,203,572 | 5/1980 | Coffman | 251/104 |

FOREIGN PATENT DOCUMENTS

3402103C1  3/1985  Fed. Rep. of Germany ...... 251/105

*Primary Examiner*—George L. Walton
*Attorney, Agent, or Firm*—Fay, Sharpe, Beall, Fagan, Minnich & McKee

[57] ABSTRACT

A rotary valve with a latching/locking operating handle assembly includes a valve body carrying a rotary valve element having an outwardly extending valve stem. A main handle body is joined to the stem and provides guide grooves for cooperating first and second operating members connected by a cam assembly such that selective horizontal movement of the first operating member produces vertical movement of the second operating member. A latch pin carried by the second member is thereby caused to move between engaged and disengaged positions with the valve body.

7 Claims, 3 Drawing Sheets

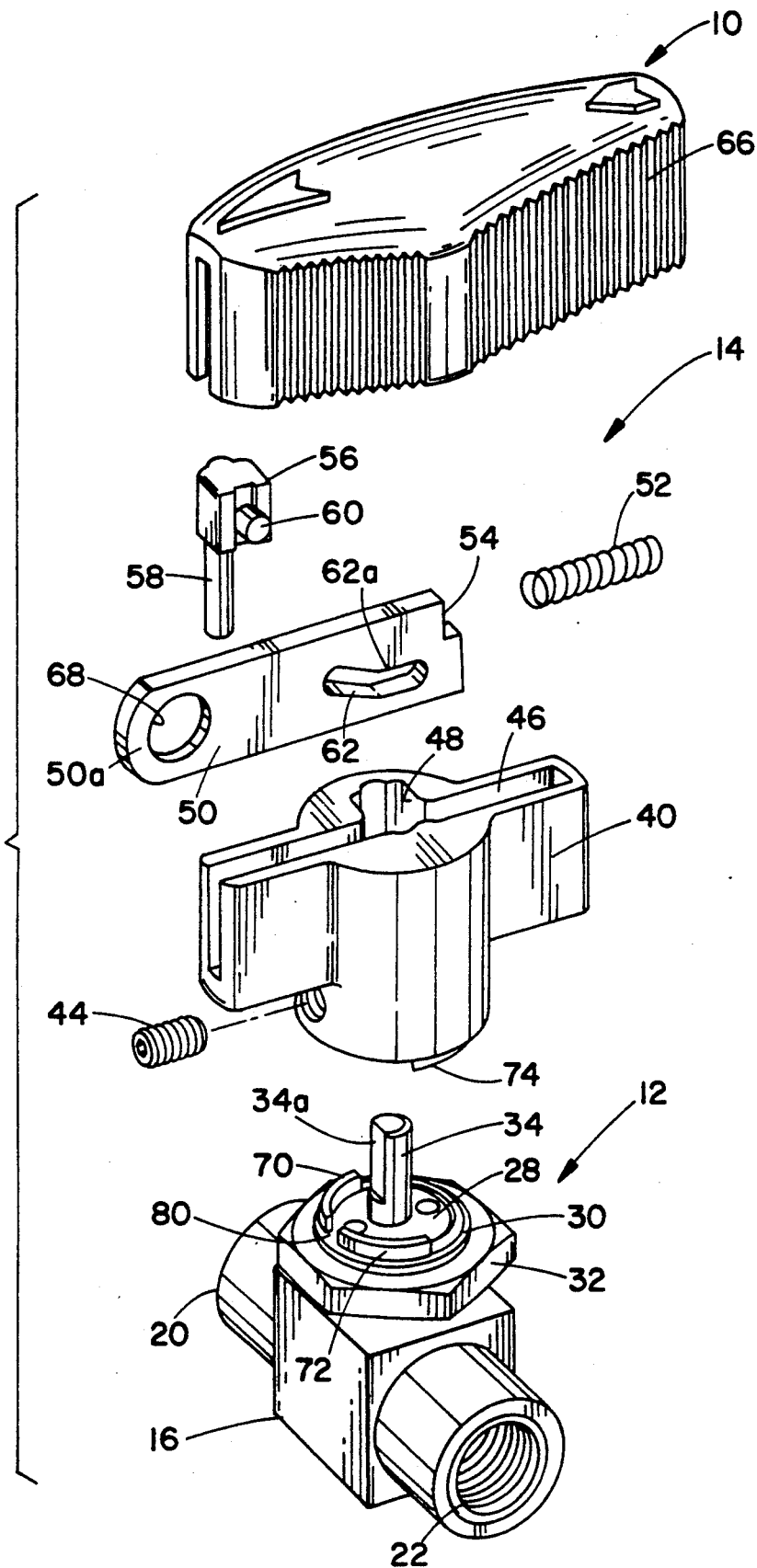

VALVE WITH HANDLE LATCH/LOCK

BACKGROUND OF THE INVENTION

The subject invention is directed toward the valve art and, more particularly, to a valve having an operating handle assembly which can be latched and/or locked in selected positions of adjustment.

The invention is particularly suited for use in ball valves and will be described with reference thereto; however, the invention is capable of broader application and could be embodied in a variety of different types of rotary valves.

It is often desirable to provide valves with operating handles that can be latched and/or locked in selection positions of adjustment. Such locking handles are needed especially in critical processing systems where improper or unauthorized changing of valve settings could result in major problems.

Many different locking valve handle arrangements have been proposed in the prior art. Typically, these prior art arrangements have comprised pivoted levers or mechanical arrangements which are somewhat awkward to use or require significant modification of the valve structure. Consequently, a need exists for an improved latching/locking valve and operating handle system.

BRIEF STATEMENT OF THE INVENTION

In accordance with the subject invention, there is provided a valve assembly which includes a valve body having a valve chamber with inlet and outlet ports connected therewith. A rotary valve element is mounted in the chamber for controlling flow between the inlet and outlet ports. An operating stem extends from the valve element to a position externally of the body, and a handle assembly is joined to the operating stem for rotating the stem between selected positions. The handle assembly includes a main handle body which defines a first guide slot extending transversely of the stem and a second guide slot extending generally in the direction of the stem. A first operating member is mounted for sliding movement in the first guide slot and a spring means acts to bias the first member in a first direction toward a first position. A second operating member carrying a downwardly extending latch pin adapted for selective engagement with the body is operatively mounted in the second guide slot for reciprocation therein. Cam means interconnect the first and second operating members such that movement of the first operating member in a direction opposite to the first direction towards a second position produces upward movement of the second operating member to disengage the latch pin from the valve body.

Preferably, the first operating member includes a portion which extends outwardly of the main handle body when the first operating member is in the first position. The portion which extends out of the valve body serves as an operating portion for moving the first operating member to a position wherein the second operating member and latch pin are moved to a disengaged position. The portion which extends out of the valve body can also serve as means for locking the valve in a selected position of adjustment.

Preferably, and in accordance with a more limited aspect of the invention, the main handle body is enclosed by a handle cover assembly which overlies and encloses the first guide slot so that the resulting handle has generally the appearance of an ordinary operating handle and the latch mechanism is totally enclosed and concealed except for the small operating portion extending from the valve handle.

In accordance with a more limited aspect of the invention, the cam means preferably includes a cam follower pin carried by the second operating member and extending into a cam track formed in the first operating member. Preferably, the first and second operating members undergo simple sliding movement at right angles to one another.

In accordance with the foregoing, a primary object of the invention is the provision of a highly simplified and reliable valve handle latching/locking assembly.

A further object is the provision of a latching/locking handle assembly of the type described wherein the latch and lock mechanisms are substantially totally enclosed in the valve handle, and the overall envelope of the valve and its operating handle assembly are not materially altered by the presence of the latching/locking mechanism.

A still further object of the invention is the provision of a valve latching/locking handle assembly wherein operation of the mechanism can be achieved with ease and without any special manipulation of the handle assembly.

BRIEF DESCRIPTION OF THE DRAWINGS

The above and other objects and advantages will become apparent from the following description when read in conjunction with the accompanying drawings wherein:

FIG. 2 is an exploded isometric view showing the major components of the valve and handle assembly illustrated in FIG. 1;

DETAILED DESCRIPTION OF THE PREFERRED EMBODIMENT

Figure 1:
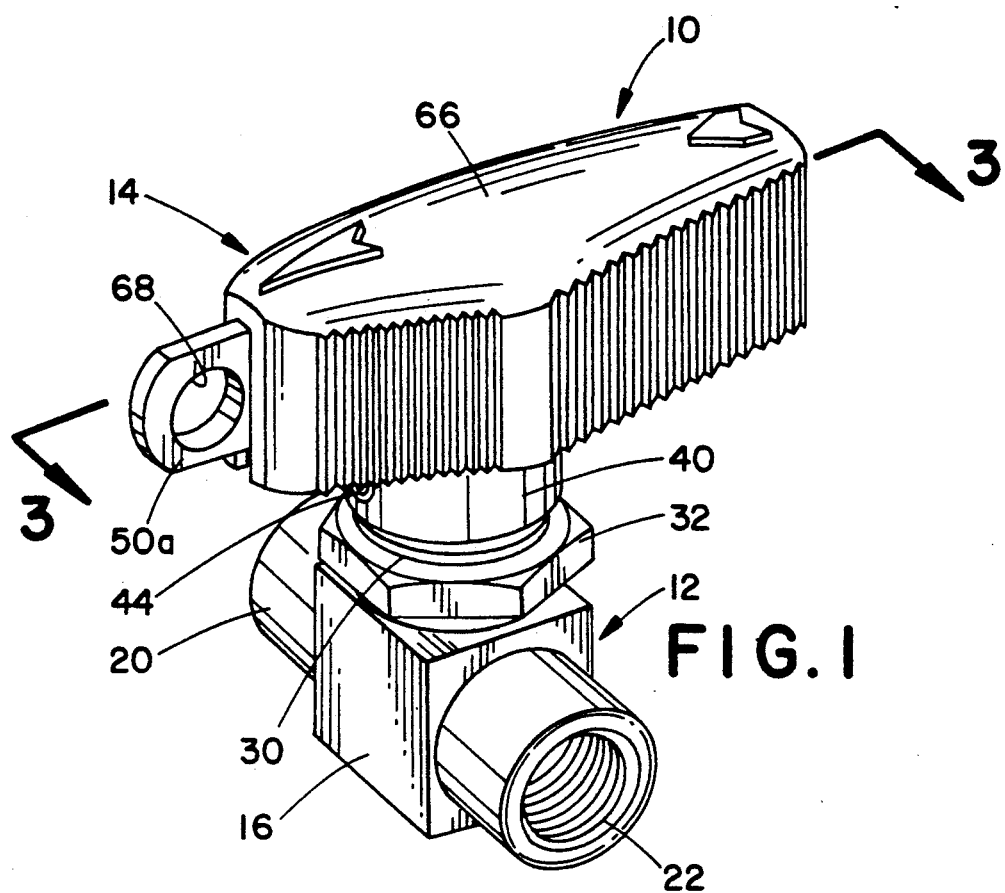
FIG. 1 is an isometric view of a valve handle assembly incorporating the improved handle locking/latching mechanism.
Figure 3:
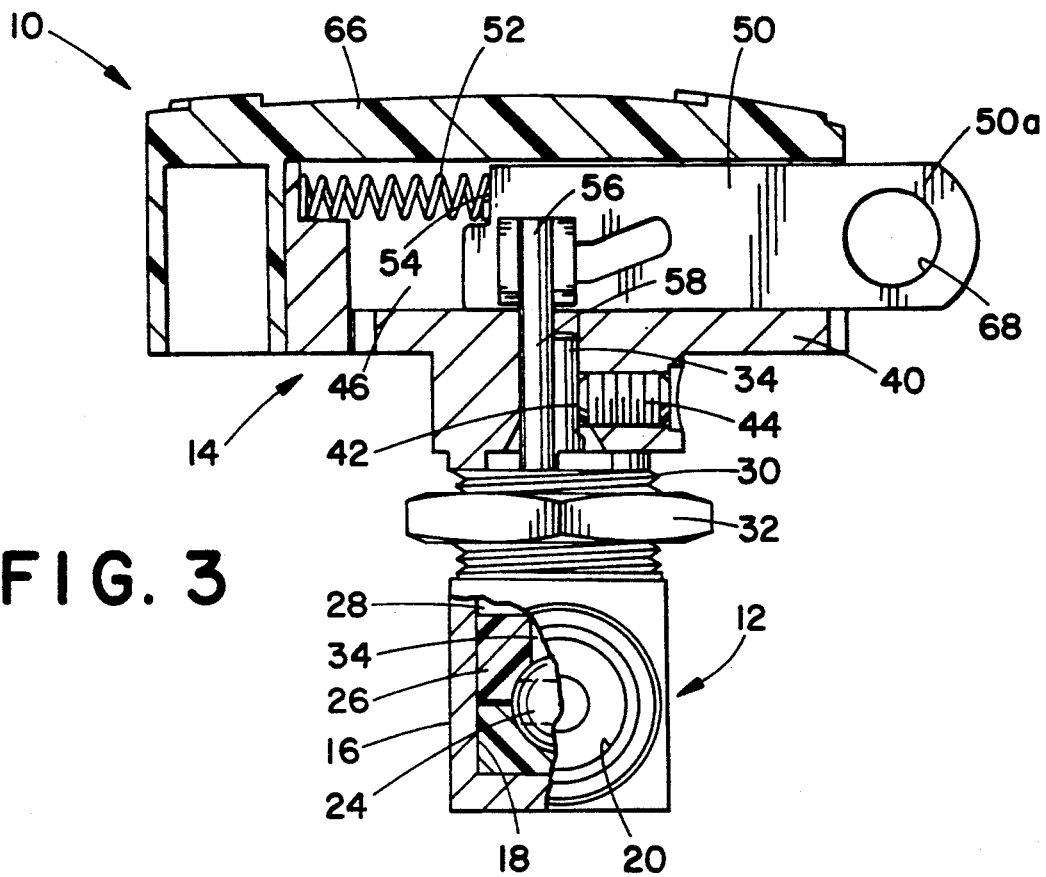
FIG. 3 is a cross-sectional view taken on line 3—3 of FIG. 1 (portions of the valve body are broken away to show the internal valve structure)
Figure 4:
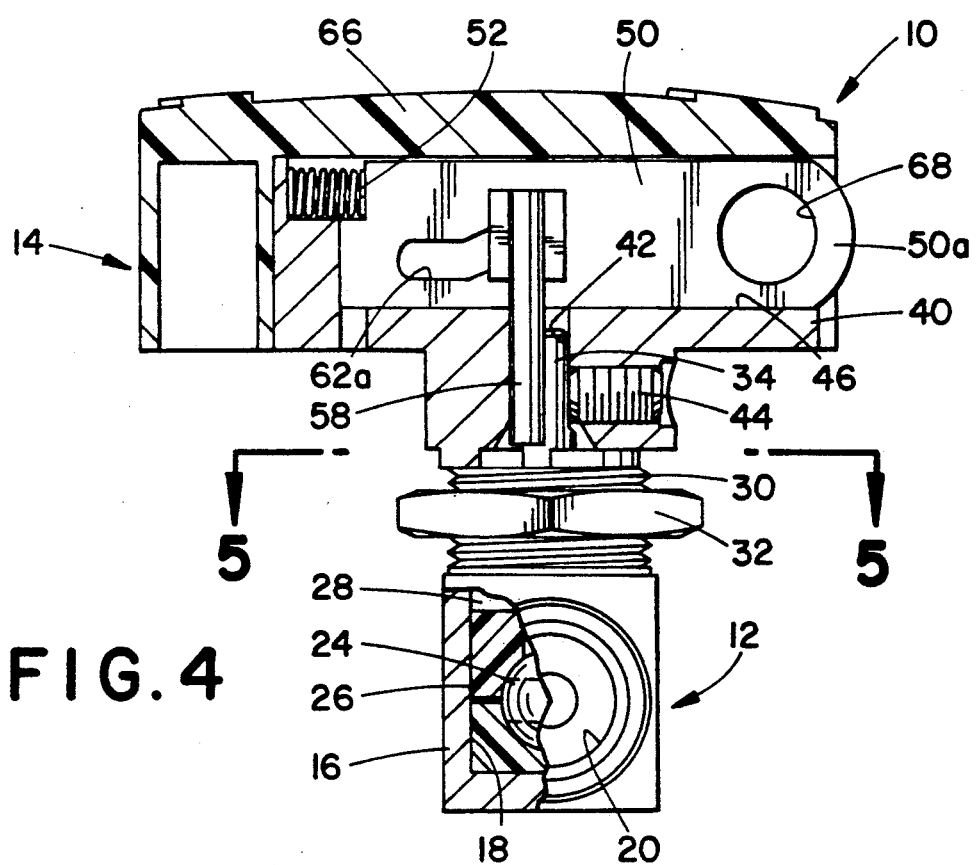
FIG. 4 is a view similar to FIG. 3 but showing the valve latching/locking mechanism in a position to permit valve adjustment; and, FIG. 5 is a cross-sectional view taken on line 5—5 of FIG. 4.

Referring more particularly to the drawings wherein the showings are for the purpose of illustrating a preferred embodiment of the invention only, and not for the purpose of limiting same, FIG. 1 shows the general overall arrangement of a valve assembly 10 which comprises a rotary ball valve 12 and an associated Operating handle assembly 14. As will become apparent, valve 12 could be any of a variety of types of rotary valves but is illustrated in the preferred embodiment as a relatively conventional rotary ball valve. In particular, the valve 12 is best seen in FIGS. 1, 3, and 4 and generally comprises a main valve body 16 that is formed of any suitable material such as stainless steel and has a generally rectangular center section that defines an interior valve chamber 18. Suitable inlet and outlet ports 20 and 22, respectively, connect with the chamber 18.

Positioned in the chamber for controlling flow between the inlet and outlet ports 20, 22 is a ball element 24. Suitable resilient, elastomeric packing 26 is compressed about the ball in a conventional fashion by a packing nut 28 (see FIG. 2). The packing nut 28 is threadedly received in the interior of a bonnet member 30 joined to the body section 16. In the embodiment illustrated, a panel nut member 32 is provided on the threaded exterior of the bonnet 3 to allow the valve assembly to be panel mounted if desired.

A cylindrical operating stem 34 extends upwardly from the ball valve element 24 to a position exteriorally of the body as best seen in FIG. 2.

As previously discussed, the details of the valve 12 could vary from that shown and described; however, of importance to the invention is the general arrangement of the latching/locking handle assembly 14. As best illustrated in FIGS. 2 through 4, the handle assembly generally comprises a main handle body member 40 that is formed from a relatively rigid material such as metal through investment casting powdered metal, or the like. The main handle body 40 is provided with an opening 42 which extends inwardly from the lower end thereof for receiving the operating stem 34. Preferably, the handle assembly is adapted to be removably connected to the stem such as through the use of a set screw 44 or the like engaged with a flat 34a on stem 34.

Extending transversely of the opening 42 is a first generally rectangular guide slot 46. A second guide slot 48 extends vertically generally parallel to opening 42. As can be seen from FIGS. 2 through 4, the slots 46 and 48 intersect.

Carried within slot 46 for free, guided, horizontal sliding movement therein is a first operating member 50 in the form of a generally flat, rectangular metal plate. The plate 50 is sized so as to be closely received in the slot 46 as best seen in FIGS. 3 and 4. The first operating member 50 is continually biased in a direction outwardly of the main handle body 40 (to the left as viewed in FIG. 2) by a compression spring 52. Spring 52 has one end bearing against the inner end wall of slot 46 and the other end received in a notch or recess 54 formed in plate 50.

Mounted for vertical sliding movement in the second guide groove or slot 48 is a second operating member 56. Member 56 is generally of rectangular configuration and is closely received and guided in guide slot 48. A latch pin 58 of generally cylindrical configuration is rigidly connected to and extends downwardly from operating member 56 for selective latching/locking engagement with the body 16 of valve 12 in a manner subsequently to be described.

In the subject embodiment, the first and second operating members 50, 56 are operatively interconnected through a cam arrangement such that movement of member 50 to the right (as viewed in FIG. 2) against the bias of spring 52 causes the operating member 56 to be driven upwardly withdrawing the latch pin 58 from engagement with valve 12. In the form illustrated, the cam means includes a cam follower pin 60 that extends laterally from operating member 56 into free sliding engagement in a cam groove 62 formed in the first operating member 50 as illustrated. The cam groove 62 is arranged such that when the operating member 50 is in its rightmost position (as viewed in FIG. 2), the cam track 62 has driven the operating member 56 to its uppermost position. However, when the operating member 50 is in its leftmost or outer position, the operating member 56 is driven downwardly to its lowest position under the horizontal cam track section 62a.

FIGS. 3 and 4 respectively illustrate the various positions of the operating assembly in the latch pin extended position and in the latch pin retracted position. Note, as shown in FIG. 3, the outer end portion 50a of the operating member 50 extends out of guide slot 46 to an exposed position when the latch pin is in its lower or valve engaging position. This allows manual engagement of portion 50a to move the operating member 50 inwardly against the bias of spring 52 to raise the second operating member 56 and latch pin 58. Preferably, the entire main body section 40 and the associated first and second operating members 50, 56 are enclosed by a cover member 66 formed of molded plastic or the like. The cover member 66 is preferably releasably connected to the main handle body 4 through the use of a set screw or the like (not shown).

Referring to FIGS. 1 and 3, it will be seen that when the handle assembly is in the latch pin extended or valve body engaged position, the outer end 50a of the first operating member 50 is extending outwardly of the cover member 66. The outer end portion 50a is preferably provided with a through opening 68 which allows use of a padlock to maintain the operating member in this extended position and to prevent unauthorized or inadvertent operation of the handle assembly.

As can be appreciated, the valve body is provided with suitable latch pin receiving or engaging portions so as to provide the required locking positions. Such latch pin receiving means can be simple openings formed in the bonnet or, alternatively, notch or stop surfaces suitably located at desired positions of valve adjustment. With the particular valve 12 illustrated in the subject embodiment, the latch pin engaging portions comprise upwardly extending arcuate stop members 70, 72 which extend upwardly from the bonnet throughout a total combined extent of approximately 180° about the stem 34. Extending downwardly from the underside of the handle body 40 is an arcuate stop member 74 (see FIG. 5) that has a circumferential extent of about 90° and is arranged such that its opposite ends 74a and 74b engage the ends of the arcuate stop members 72 and 70 when the valve is in the closed and open positions, respectively.

Figure 5:
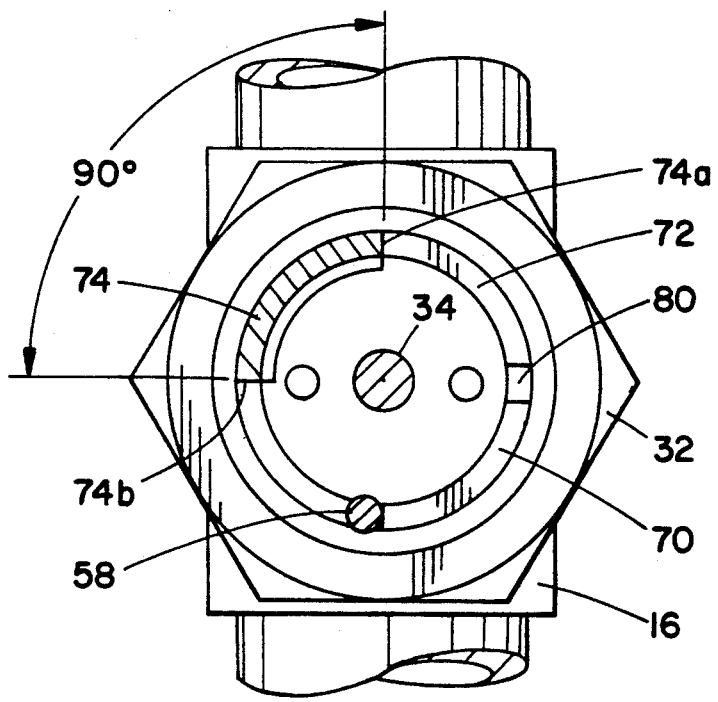

The FIG. 5 showing illustrates the valve in the closed position and portion 74a is in engagement with the ends of stop member 72. At this time, the latch pin 58 is engaged with the end of stop member 70 and movement of the valve cannot take place. However, when latch pin 58 is moved to the upper position shown in FIG. 4, the valve handle can be rotated to a position wherein stop surface 74b engages the end of stop member 70 and latch pin 58 can enter into the opening 80 between the two arcuate stop members 70 and 72. At this time, the valve is latched in the open position. It is, of course, possible to arrange the valve so that it will latch in only one of two selected positions. Alternatively, rather than using the raised interengaging stop surfaces illustrated, it would, of course, be possible merely to provide drilled openings in the valve body, bonnet, or even the packing nut for receiving the latch pin 58 in a lowered position.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A valve assembly comprising:

a valve body defining a valve chamber having inlet and outlet ports connected therewith;

a rotary valve element mounted in said chamber for controlling flow between the inlet and outlet ports;

a bonnet member;

an operating stem extending from the valve element to a position externally of the body;

a handle assembly joined to the operating stem for rotating the stem between selected positions, the assembly including a handle body defining a first guide slot extending transversely of the stem and a second guide slot extending generally in the direction of the stem, a first operating member mounted for sliding movement in the first guide slot, spring means biasing the first member in a first direction toward a first position, a second operating member carrying a downwardly extending latch pin adapted for selective engagement with the body, said second' operating member being guided for sliding movement in the second slot and cam means interconnecting said first and second operating members such that movement of the first operating member in a direction opposite to the first directions toward a second position produces upward movement of the second operating member and the latch pin to disengage the latch pin from the valve body.

2. A valve assembly as defined in claim 1 wherein said valve body includes a bonnet member through which the stem extends, the bonnet member including openings for receiving the latch pin at selected positions of adjustment of the handle assembly.

3. A valve assembly as defined in claim 1 wherein the first operating member includes an end portion which is manually accessible from exteriorly of the handle body for moving the first operating member in a direction opposite the first direction.

4. A valve assembly as defined in claim 1 wherein the handle body includes a cover portion which overlies the first guide slot.

5. A valve assembly as defined in claim 1 wherein the handle body is releasably connected to the stem and wherein the first operating member includes means permitting it to be locked in the first position.

6. A valve assembly as defined in claim 5 wherein the first operating member includes a portion that extends out of the handle body when the first operating member is in the first position.

7. A valve assembly as defined in claim 6 wherein the second operating member includes a cam follower pin which extends into engagement with a cam surface on the first operating member.

* * * * *